G. V. HARRIMAN.
PISTON.
APPLICATION FILED MAY 23, 1918.
1,394,898.
Patented Oct. 25, 1921.
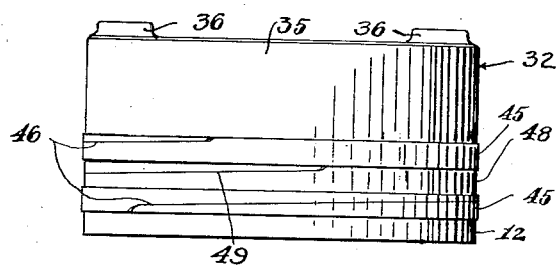
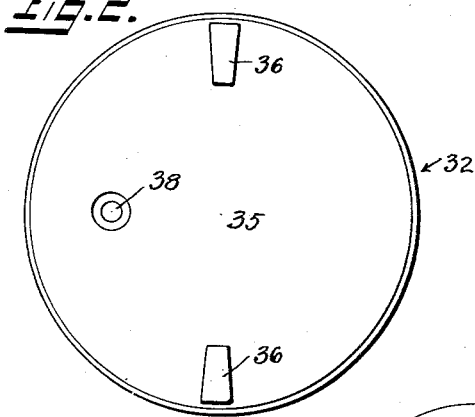
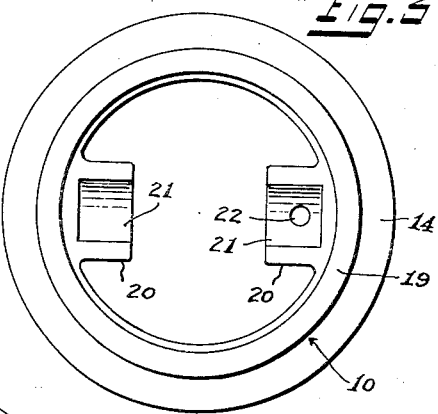
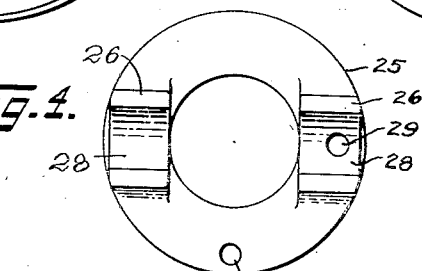
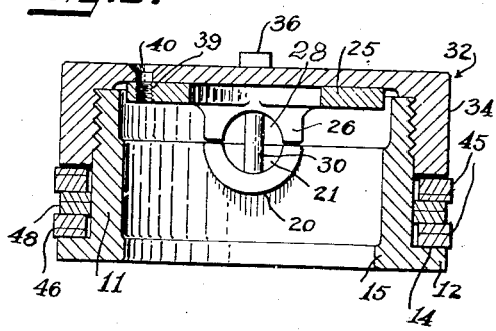
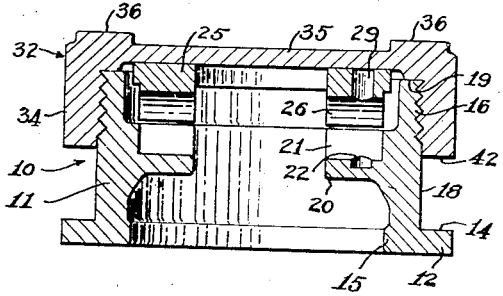
Witnesses:
INVENTOR
George V. Harriman,
BY
ATTORNEY

UNITED STATES PATENT OFFICE.

GEORGE V. HARRIMAN, OF NEW YORK, N. Y.

PISTON.

1,394,898.  Specification of Letters Patent.  Patented Oct. 25, 1921.

Application filed May 23, 1918. Serial No. 236,109.

*To all whom it may concern:*

Be it known that I, GEORGE V. HARRIMAN, a citizen of the United States, residing in New York city, in the county of New York and State of New York, have invented certain new and useful Improvements in Pistons, of which the following is a specification.

This invention relates to pistons for internal combustion engines or other engines and machines, and has for its object to provide an efficient durable piston having the advantages hereinafter set forth.

As will be fully explained hereinafter the new piston comprises a main body portion or skirt having bearing recesses forming portions of bearings for the wrist pin of the connecting rod of the engine or the like. A yoke ring has recesses coöperating with said bearing recesses and is held in place by a cap screwed on the skirt.

While hereinafter I describe all of the details of the invention, it is particularly noted that the invention is not limited to these since the details of construction and combination may be greatly varied without departing from the spirit of my invention or exceeding the scope of the claims.

Figure 1 is a side elevation of the piston.

Fig. 2 is a plan of the cap.

Fig. 3 is a plan of the skirt.

Fig. 4 is a plan of the yoke ring.

Fig. 5 is a central longitudinal vertical sectional view taken on a plane perpendicular to the axis of the wrist pin bearings.

Fig. 6 is a similar view taken at right angles to said plane.

My improved piston comprises a main body portion or skirt 10 (Figs. 3, 5 and 6) comprising a main cylindrical portion 11 open at both ends and provided at its lower end with an outwardly projecting flange or lip 12 having a smooth upper face 14 perpendicular to the axis of the piston. The lower edge of the cylindrical portion is also provided with an inwardly projecting bead 15 for strengthening purposes. The upper part of the cylindrical portion is provided with an outer threaded portion 16 between which and said flange or lip 12 there is a smooth cylindrical surface 18. The annular top face 19 of the cylindrical portion 11 is also a true horizontal plane perpendicular to the axis of the piston. Within the cylindrical portion 11 there is a pair of diametrically disposed brackets 20 on the inner wall of the main portion and each provided with an upwardly opening semi-cylindrical recess 21 in axial alinement with each other and disposed axially perpendicular to the axis of the skirt. One of the brackets has drilled therein a small hole 22 for purpose which will be explained.

Within the upper part of the skirt, there is provided a yoke ring 25 (Figs. 4, 5 and 6) having bosses 26, each provided with a diametrically opposite recess 28 adapted to coöperate with the recess 21 of said brackets 20 to form cylindrical bearings for a connecting rod wrist pin (not shown), one of the bosses 26 having drilled therein a vertical bore 29 alined with said hole 22 of the bracket 20, for receiving a locking pin 30 (Fig. 5) for locking the wrist pin in place and holding it against turning in the piston. The yoke ring and the two bosses are all cut from one piece of material.

Upon the threaded portion 16 there is screwed a cap 32 Fig. 2 comprising a cylindrical internally threaded wall 34 having screw threaded engagement with the threaded portion of the skirt. The upper end wall 35 of the cap is provided with a pair of wrench receiving lugs 36, by means of which the cap may be screwed on or off. The cap is also provided with a countersunk opening 38 adapted to register with a threaded opening 39 of the yoke ring 25 and to receive therein a small screw 40 Fig. 5 for holding the cap and the yoke ring locked together.

The lower face 42 Fig. 6 of the cap is also a true plane perpendicular to the axis of the piston; and between this lower face and the upper face 14 of the flange or lip 12 there are disposed a pair of inwardly yielding outwardly springing piston rings 45 each provided with a diagonal lap joint 46. Between the outwardly springing piston rings is disposed an inwardly springing piston rig 48 also provided with a lap joint 49 and adapted to press against the smooth face 18 of the skirt.

The cap 32 is in size a little smaller in diameter than the cylinder in which it functions and is cylindrical in shape. The cap is machined throughout. The inner face of the top wall of the cap and the lower edge of the wall of the cap are both true planes perpendicular to the vertical axis of the piston. The lower edge of the wall of the cap forms the upper limit of movement of the piston ring.

When it is desired to remove or have access to the wrist pin or the piston rings, it is only necessary to remove the screw 40 and the cap 35; and it is noted that this may all be done from above, merely by first providing access to the cylinder, as by removing the cylinder head.

1. The center of gravity of the piston is below the center of suspension in the matter of weight.

2. In the matter of applied pressure, both by compression and by explosion, the center of balance of the piston remains below the center of suspension.

3. When the explosion occurs there will be, ordinarily, no more raw gas to explode at one side of the piston than there will be at the other and therefore there can be no piston slap.

4. But if there should be a little more gas on one side of the piston than at the other, when explosion comes the balance will be reasserted instead of aggravated (as in the heretofore types of piston) because the downward pressure is exerted against the rings at a point below the center of suspension, and equally all around.

5. However, since the point of pressure on the rings is below the point of suspension, the piston will, as it comes to the top of the compression stroke, balance itself because of the equal pressure on the rings all around the piston.

6. This preponderating height of balance of the point of suspension over point of application of pressure, however is not too high.

7. It is not so high that, as the angularity of the connecting rod under pressure increases on the power stroke or on the compression stroke, the piston will be thrown into a tipped position.

8. It is of sufficiently small preponderance that the pressure on the rings will at all times correct the tendency noted in paragraph 7.

9. The advantages noted above make it possible to use a much shorter piston than is in common use on engines at present.

10. Because the piston is self-balancing, the guiding function of the piston is not so important—being, in fact, almost not needed.

11. Because the wrist pin and its bearings are entirely within the piston and because there are therefore no holes in the piston walls, it is possible to place the rings at any point along the height of the piston and they do not have to be arbitrarily placed on account of the position of the wrist pin and its retainers.

12. Because of the use of the rings and their mehod of functioning it is unnecessary to use more than three rings, two rings with a washer between being permissible.

13. Due to the facts enumerated in paragraph 10, 11, and 12 a large amount of unnecessary metal and therefore unnecessary weight is done away with.

14. This will reduce vibration of the engine which is always largely due to the overcoming of the inertia of the piston at each end of the piston stroke.

15. It will also reduce the frictional, and hence the total, heat of an engine because . . .

16. There is less metal in contact . . .

17. There are fewer rings rubbing against the cylinder . . .

18. The rings are practically the only part of the piston which will rub against the cylinder (due to the self-balancing properties of the piston) . . .

19. Any given cylinder wall area has a lesser interval of cover by hot metal and a greater interval of contact with cool air or with cool gas mixture . . .

20. Therefore the oil used in the cylinders will carbonize less quickly, retaining its lubricating qualities longer.

21. A greater charge can be used, and more often, while not overheating the engine,—in the cylinders; the engine becomes more powerful and can be used for longer periods without fear of excessive overheating.

22. There will be less distortional expansion in both the cylinders and the piston.

23. Lubrication is most necessary for the piston rings, more than any other part of the piston.

24. In addition to the "oil wipe" action of the piston rings they are nearest to the oil film in the crank case and there is nothing to impede their getting more oil than any other rubbing part of the piston.

25. In all upward strokes of the piston the friction of the rings against the cylinders causes them to become bedded together and to rest firmly against the lip of the skirt of the cylinder. It should be noted that as pressure is increased on the piston the seal tightens.

26. The seal of the upper portion of the cylinder takes place, first, between the piston and the cylinder walls by the rubbing of the circumference of the top and bottom rings against the cylinder walls; second, between the piston and the piston rings (top and bottom rings) by the rubbing of the middle ring against the circumference of the skirt of the piston; third, diametric seal, between the sides of the first and second ring (top to bottom), between the sides of the second and third ring, and (note) between the bottom side of the third ring and the lip of the piston skirt.

27. The seal of the upper portion of the cylinder takes place, on all downward strokes of the piston except the power stroke first, between the lower edge of the piston cap and the top side of the first ring; and all other seals take place as enumerated in paragraph 32 except that part of paragraph 26 following the word "Note."

28. The seal of the upper portion of the cylinder on the power stroke takes place exactly the same as in paragraph 26.

29. Because the seal of the upper portion of the cylinder is nearly perfect, there is no danger of oil from the crank case causing the engine to smoke.

30. This type of piston is as readily applicable to a double action engine as to a trunk engine.

31. It is as readily applicable to a steam as to an internal combustion engine.

32. This piston can be applied, removed, assembled, or disassembled from the top of the engine (cylinder head end) without disturbing any other part of the engine than is necessary to cause the head end of the cylinder to be open.

33. It can also be applied, removed, assembled, or disassembled in the same manner as pistons of the present type.

34. It can be adjusted in both cases mentioned.

35. This piston, being in three parts and smaller than the present type, will not have to be entirely replaced unless all three parts have injury, and in case of replacement of a part will have a much lower cost than is now the case.

I claim:

1. A piston comprising a hollow skirt provided interiorly with a wrist-pin receiving bearing closed at both ends; and removable means disposed in said skirt and removable through the piston head and for removably holding the wrist-pin in place.

2. A piston comprising a hollow skirt provided with an exteriorly threaded upper portion, an outwardly extending flange at the lower end, and on the interior with brackets each provided with an upwardly opening recess in the bottom of one of which there is provided a small pin receiving hole; a yoke-ring provided with bosses having downwardly opening recesses disposed respectively over said upwardly opening recesses; one of said bosses being provided with a bore alined with said hole; a pin in said bore and hole; a cap disposed over said skirt and provided with an interiorly threaded downwardly extended wall to engage the threaded portion of the skirt and coöperating with the outwardly extending flange of the skirt to form an annular recess on the exterior of the piston; and piston rings in said annular recess.

3. A piston comprising a piston body provided with wrist-pin receiving recesses; means holding the pin against turning movement; piston rings around said body; and a unitary member holding said means and rings in place.

4. A piston comprising a piston body provided with wrist-pin receiving recesses; means for holding the wrist pin in the recesses; means holding the pin against turning movement and a unitary member holding both of said means in place.

5. A piston comprising a piston body provided with wrist-pin receiving recesses; means for holding the wrist pin in the recesses; means holding the pin against turning movement; piston rings around said body; and a unitary member holding both of said means and rings in place.

6. A piston comprising a piston body provided with wrist-pin receiving recesses; means for holding the wrist-pin in the recesses; means for holding the pin against turning movement; piston rings around said body; and a piston head holding both of said means and rings in place.

7. A piston comprising a piston body provided with an outwardly extending flange at the lower end, and on the interior with upwardly opening recesses; a yoke-member provided with opening recesses disposed respectively over said upwardly opening recesses and with a bore intersecting one of said recesses; a retaining pin in said bore; piston rings around said body above said flange; and a cap secured to said body and holding said yoke-member, said retaining pin and said piston rings in place.

8. A piston comprising a hollow skirt provided with an outwardly extending flange at the lower end, and on the interior with brackets each provided with an upwardly opening recess, in the bottom of one of which there is provided a small pin receiving hole; a yoke-ring provided with bosses having downwardly opening recesses disposed respectively over said upwardly opening recesses, one of which bosses being provided with a bore alined with said hole; a retaining pin in said bore and hole; piston rings around said skirt above said flange; and a cap disposed over said skirt and secured thereto and holding said yoke-ring, said retaining pin and said rings in place.

9. A piston comprising a hollow skirt provided with an exteriorly threaded upper portion, and on the interior with brackets integral with the skirt and each provided with an upwardly opening recess; a yoke-ring provided with bosses having downwardly opening recesses disposed respectively over said upwardly opening recesses and coöperating therewith to form wrist-pin receiving bearings; and a removable cap disposed over said skirt and provided with a downwardly extended wall interiorly threaded to engage the threaded portion of the skirt and to removably hold said yoke-ring in place and permit the removal of the yoke-ring and wrist-pin when the cap is removed.

10. A piston comprising a hollow skirt provided on the interior with brackets provided with an upwardly opening recess having closed outer ends integral with said brackets; a yoke-member provided with downwardly opening recesses disposed respectively over said upwardly opening recesses and coöperating therewith to form wrist-pin receiving bearings; and a means secured over said skirt to removably hold said yoke-member and wrist-pin in place.

11. A piston comprising a hollow skirt provided on the interior with upwardly opening recesses; a yoke-member provided with downwardly opening recesses disposed respectively over said upwardly opening recesses and coöperating therewith to form wrist-pin receiving bearings; a removable cap disposed over said skirt and member and secured to the skirt; and means holding the cap and yoke-member against relative rotation.

12. A piston comprising a hollow skirt provided with an exteriorly threaded upper portion, and on the interior with brackets each provided with an upwardly opening recess; a yoke-ring held against rotation relative to said skirt and provided with downwardly opening recesses disposed respectively over said upwardly opening recesses and coöperating therewith to form wrist-pin receiving bearings; a removable cap disposed over said skirt provided with a downwardly extended wall interiorly threaded to engage the threaded portion of the skirt; and means for holding the cap and ring against relative rotation.

13. A piston comprising a hollow skirt provided with an exteriorly threaded upper portion, and on the interior with brackets provided with an upwardly opening recess; a yoke-ring held against rotation relative to said skirt and provided with a threaded opening and with downwardly opening recesses disposed respectively over said upwardly opening recesses and coöperating therewith to form wrist-pin receiving bearings; a removable cap disposed over said skirt and having an opening for alinement with said threaded opening and provided with a downwardly extended wall interiorly threaded to engage the threaded portion of the skirt; and screws in said alined openings for holding the cap and ring against relative rotation.

14. A piston comprising a hollow skirt having at its lower piston-edge a ring-supporting lateral flange and provided on the interior with upwardly opening recesses; a member coöperating with said recesses to form wrist-pin receiving bearings; and a removable cap disposed over said skirt and provided with a downwardly extended wall secured to the skirt and having a flat piston-ring-engaging lower edge face, said cap being adapted to removably hold said member and pin in place; and piston rings between said flange and face.

15. A piston comprising a hollow skirt having at its lower part a piston ring-supporting lateral flange and provided with an exteriorly threaded upper portion, and on the interior with upwardly opening recesses; a yoke-member provided with downwardly opening recesses coöperating with the upwardly opening recess to form wrist-pin receiving bearings; and a removable cap disposed over said skirt and member and provided with a downwardly extended wall interiorly threaded to engage the threaded portion of the skirt and having a flat piston-ring-engaging lower end face, and piston rings between said lateral flange and face.

16. A piston comprising a hollow skirt provided on the interior with brackets each provided with an upwardly opening recess; a yoke-ring provided with downwardly opening recesses coöperating with said upwardly opening recesses to form wrist-pin receiving bearings; a removable cap secured over said skirt ring and provided and adapted to removably hold said yoke ring and wrist-pin in place; and means for holding the wrist-pin against rotation.

GEORGE V. HARRIMAN.

Witnesses:
W. L. MORELY,
C. F. LANG.